(12) United States Patent
Huls et al.

(10) Patent No.: US 6,488,344 B2
(45) Date of Patent: Dec. 3, 2002

(54) DISTRIBUTION OF TORQUE WHEN DRIVEN WHEELS SLIP DURING REGENERATIVE BRAKING

(75) Inventors: Timothy Allen Huls, Plymouth, MI (US); Steven Lee Napier, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 51 days.

(21) Appl. No.: 09/848,570

(22) Filed: May 3, 2001

(65) Prior Publication Data

US 2002/0163250 A1 Nov. 7, 2002

(51) Int. Cl.⁷ .............................. B60T 13/74
(52) U.S. Cl. ............ 303/152; 180/165; 303/113.5
(58) Field of Search ............... 303/152, 113.5, 303/3.15, 20, 186; 180/165, 197, 65.1–65.7

(56) References Cited

U.S. PATENT DOCUMENTS

| | | | |
|---|---|---|---|
| 4,591,016 A | * 5/1986 | Matthews | 180/165 |
| 4,962,969 A | 10/1990 | Davis | |
| 5,269,390 A | 12/1993 | Glover et al. | |
| 5,294,191 A | 3/1994 | Giorgetti et al. | |
| 5,358,084 A | 10/1994 | Schramm | |
| 5,378,053 A | 1/1995 | Patient et al. | |
| 5,421,643 A | 6/1995 | Kircher et al. | |
| 5,450,324 A | 9/1995 | Cikanek | |
| 5,551,764 A | 9/1996 | Kircher et al. | |
| 5,573,312 A | 11/1996 | Muller et al. | |
| 5,615,933 A | 4/1997 | Kidston et al. | |
| 5,632,534 A | 5/1997 | Knechtges et al. | |
| 5,895,100 A | 4/1999 | Ito et al. | |
| 6,070,689 A | 6/2000 | Tanaka et al. | |
| 6,076,899 A | 6/2000 | Isella | |
| 6,086,166 A | 7/2000 | Fukasawa | |
| 6,099,089 A | 8/2000 | Schneider | |

* cited by examiner

Primary Examiner—Matthew C. Graham
(74) Attorney, Agent, or Firm—Dykema Gossett PLLC; Carlos L. Hanze

(57) ABSTRACT

A method of braking an electric or hybrid vehicle 7 is provided. The vehicle (7) has electric regenerative brakes and friction brakes (94). In a normal braking situation regenerative brakes are applied. If a wheel (42) slip condition is sensed, a selectively operable clutch (76) tortionally connects an undriven axle (60) to the driven axles (44, 45) to alleviate the slip condition. The alleviation of the slip condition prevents the electric regenerative brakes from being shut off in favor of an antilock friction brake application.

12 Claims, 2 Drawing Sheets

US 6,488,344 B2

DISTRIBUTION OF TORQUE WHEN DRIVEN WHEELS SLIP DURING REGENERATIVE BRAKING

FIELD OF THE INVENTION

The present invention relates generally to electric or hybrid electric vehicles. More specifically, the present invention relates to an electric or hybrid electric vehicle (HEV) having regenerative and friction brakes that utilize wheel slip data of the regeneratively braked axle to selectively tortionally connect a second axle with the first axle to extend the range of regenerative braking.

BACKGROUND OF THE INVENTION

The general principle of regenerative braking is recognized by manufacturers of electric and HEVs as a way to increase the overall efficiency of the vehicle. Regenerative braking seeks to recover the kinetic energy of the vehicle which is normally dissipated as heat through a normal hydraulic friction brake system, by operating the electric motor drive as a generator to restore the generated electricity to a battery or other energy storage device. However, regenerative braking has certain limitations. The maximum amount of regenerative braking torque available is not a constant, but is a function of a normal force at a tire's patch and a rolling surface coefficient of friction. If the regenerative brake torque demand exceeds the physics of this interface, wheel slip will be triggered. Most antilock braking systems (ABS) require that the brakes be applied and released on a given wheel at a rate that exceeds the frequency response of the typical electric motor. Many ABS require that the friction brakes be applied and released on a given wheel approximately a minimum of seven times a second. Accordingly, during an ABS incident, most electric and HEVs are programmed to shut off the regenerative braking and begin the friction braking. Shutting off the regenerative braking causes energy losses and a lowering of overall fuel economy. It would therefore be advantageous to provide a method of braking for an electric or a HEV wherein the incidents which require a termination of regenerative braking during an ABS mode of operation be minimized. This and other issues related to electric and HEVs are the subject of the following U.S. Pat. Nos. 4,962,969; 5,269,390; 5,294,191; 5,358,084; 5,378,053; 5,421,643; 5,450,324; 5,551,764; 5,573,312; 5,615,933; 5,632,534; 5,895,100; 6,070,689; 6,076,899; 6,086,166; and 6,099,089.

SUMMARY OF THE INVENTION

In a preferred embodiment of the present invention, when a regenerative braking situation occurs such as in a lift throttle or operator-signaled brake command, a motor generator regeneratively brakes the driven wheels of a primary driving axle of the vehicle. If a slip condition occurs wherein the driven wheels are locked by application of the regenerative brakes, a clutch which torsionally connects the secondary axle to the primary axle is engaged. Regenerative braking will then occur over all four wheels of the vehicle, effectively cutting in half the friction requirement for the primary driven wheels. Accordingly, in many cases the primary driven wheels will become unlocked and the ABS operation will not be required. Not using the ABS mode of operation allows regenerative braking to be maintained and accordingly, the fuel economy of the vehicle is enhanced. When the regenerative braking operation is over, the clutch between the two axles may be opened and the vehicle can continue onward in a two-wheel drive mode of operation.

An advantage of the present invention is to provide a method of regenerative braking for a four-wheel drive electric or HEV which also has conventional brakes for an antilock mode of operation.

A further advantage of the present invention is to provide a four-wheel drive vehicle which can stay in a regenerative braking operation for longer periods of time than previously possible.

Other advantages of the present invention will become more apparent to persons having ordinary skill in the art to which the present invention pertains from the following description taken in conjunction with the accompanying drawings.

DETAILED DESCRIPTION OF THE INVENTION

Figure 1:
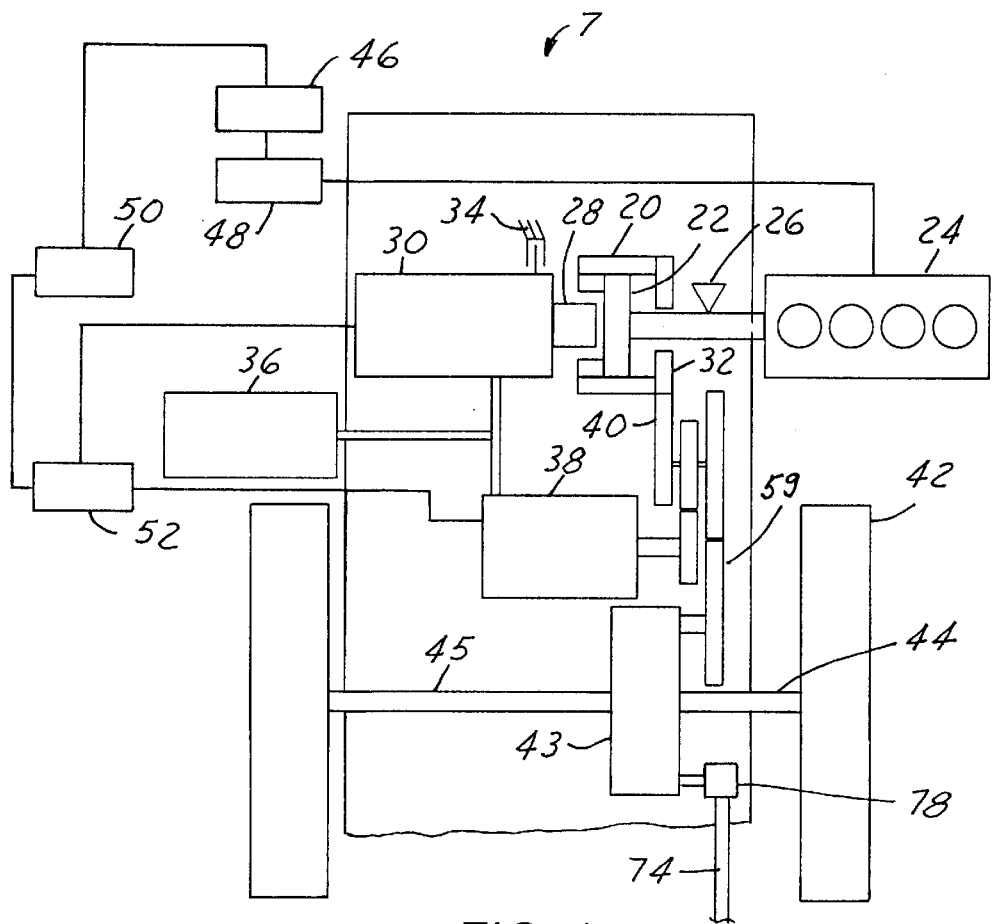
FIG. 1 illustrates a general hybrid electric vehicle configuration for the normally driven wheels.
Figure 2:
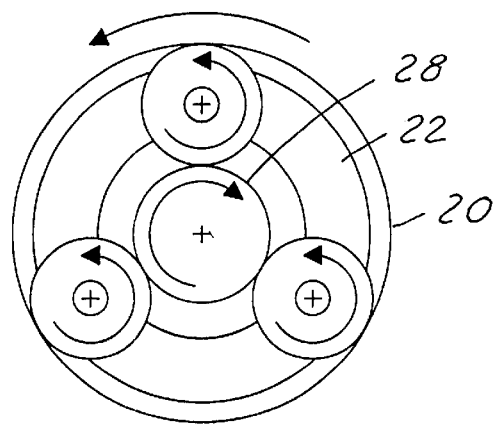
FIG. 2 illustrates a planetary gear set for the vehicle show in FIG. 1.

FIGS. 1 and 2 demonstrate a front wheel drive portion of a possible HEV configuration, specifically a parallel-series hybrid electric vehicle 7 (powersplit) configuration.

A planetary gear set 20 mechanically couples a gear carrier 22 to an internal combustion engine 24 via a one way clutch 26. The planetary gear set 20 also mechanically couples a sun gear 28 to a generator motor 30 and a ring (output) gear 32. The generator motor 30 is also mechanically linked to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to front drive wheels 42 via gear 59, transaxle 43 and axle half shafts 44 and 45.

The planetary gear set 20 splits the engine 24 output energy into a series path from the engine 24 to the generator motor 30 and a parallel path from the engine 24 to the drive wheels 42. Engine 24 speed can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allowing all the energy in engine 24, minus conversion losses, to reach the drive wheels 42.

A vehicle system controller (VSC) 46 controls many components in HEV 7 by connecting to each component's controller. The engine control unit (ECU) 48 connects to the engine 24 via a hardwire interface. The ECU 48 and VSC 46 can be based in the same unit, but are actually separate controllers. The VSC 46 communicates with the ECU, as well as a battery control unit (BCU) 50 and a transaxle management unit (TMU) 52 through a communication network such as a controller area network (CAN) (not shown). The BCU 50 connects to the battery 36 via a hardwire interface (not shown). The TMU 52 controls the generator motor 30 and traction motor 38 via a hardwire interface.

Figure 3:
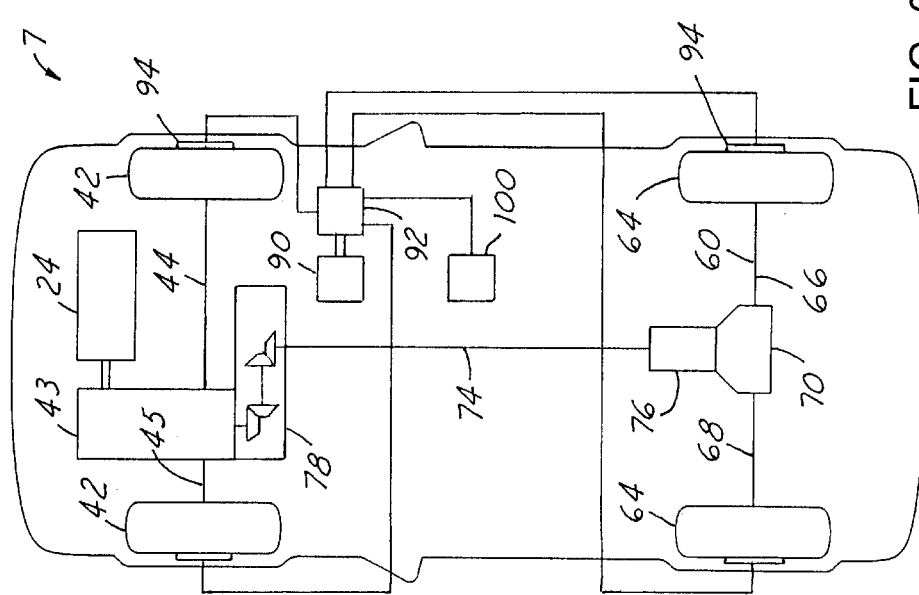
FIG. 3 illustrates a general four wheel drive hybrid electric vehicle configuration.

Referring additionally to FIG. 3, the vehicle 7 according to the present invention additionally has a rear axle 60. Rear axle 60 has wheels 64 and half shafts 66, 68. The half shafts 66, 68 are powered via a rear differential 70. The rear differential 70 is connected to a drive shaft 74 by a rear axle electronic clutch 76. The rear axle electronic clutch 76 can be a viscous-type clutch, which can additionally be electrically actuated upon command. The clutch 76 is normally engaged by a rotational difference between the rear wheels 64 and front wheels 42. At other times the clutch is normally non-engaged. The drive shaft 74 is connected to a power take off unit 78. The power take off unit 78 torsionally connects the drive shaft 74 with an output shaft from the transaxle 43.

The vehicle 7 also has a conventional hydraulic braking system having a master cylinder 90 which is connected to an anti-skid or antilock brake module 92. The brake module 92 allows the master cylinder 90 to be directly connected to foundation friction brakes 94 during normal brake operation. During ABS mode of operation, the brake module 92 will isolate the foundation brakes 94 from the master cylinder 90 and will then modulate the mode of operation. During ABS mode of operation, brake module 92 will be controlled by a brake controller 100. The brake controller 100 will be in communication with wheel speed sensors (not shown) which monitor the front wheels 42 and rear wheels 64. Brake controller 100 will be connected to the vehicle main communicative bus allowing it to communicate with other components as required, typically including the VSC 46.

Figure 4:
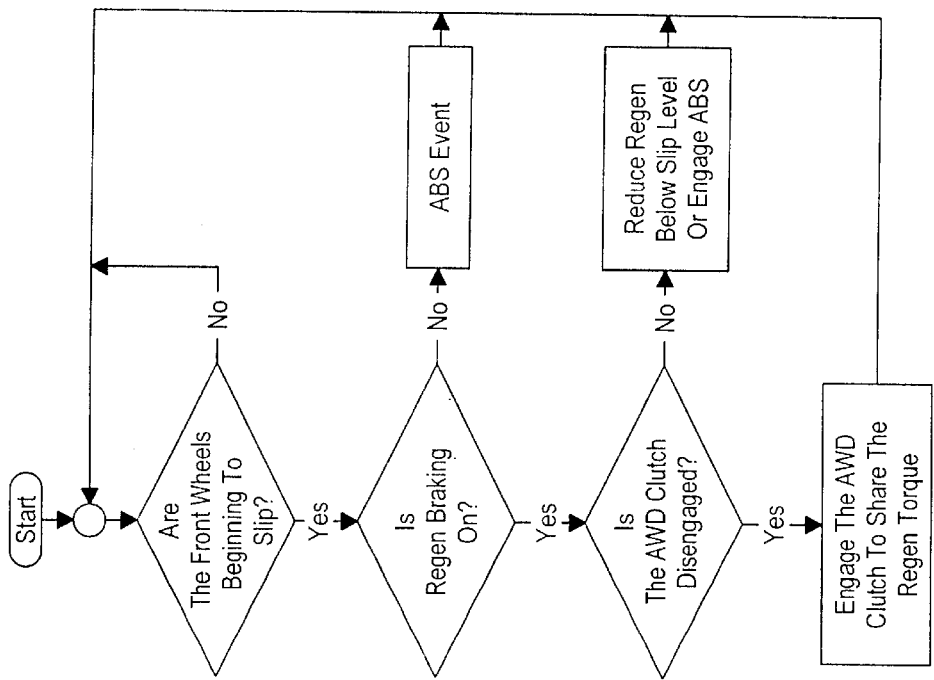
FIG. 4 illustrates a flowchart illustrating operation of the braking system of the vehicle shown in FIG. 3.

Referring to FIG. 4, in an operation due to a lift throttle incident (commonly referred to as compressive braking) or by virtue of an operator-commanded brake signal, regenerative braking will be applied to the primary driven front axle. The regenerative braking will occur due to the action of the traction motor 38. If the driven wheels 42 are on a low friction surface such as ice or gravel, a slip condition can occur, meaning that the wheels are slipping on the road surface. The slip condition is also commonly referred to as a locked condition wherein the brakes (regenerative or friction) have locked the wheels 42 from rotation. A slip condition can be sensed by virtue of control parameters which may include vehicle speed, wheel speed, regenerative torque and undriven axle clutch torque. When a slip condition is sensed, the VSC 46 will sense if the undriven axle 60 electronic clutch 76 is disengaged. If the electronic clutch 76 is disengaged the VSC 46 will signal it to engage. The engagement of the electronic clutch 76 will cause the regenerative braking to occur not only against the driven axle (half shafts 44, 45) but also against the torque of the undriven wheels 42 via the undriven axle 60. Accordingly the torque available to stop the driven wheels 42 will be halved and in many instances the driven wheels 42 will be relieved from their slip condition. Accordingly the slip condition indication for the wheels 42 will be relieved and regenerative braking can continue. In instances where both the front 42 and rear wheels 64 are on low friction surfaces the VSC 46 will signal the regenerative braking to be reduced. If reduction of the regenerative braking does not relieve the slip conditions the VSC 46 will signal the brake controller 100 to engage into an ABS mode causing the brake module 92 to isolate the master cylinder 90 and to pulsate the friction brakes 94. When a slip condition is relieved, the brake controller 100 can signal for the brake module 90 to cease ABS actuation and regenerative braking can again be instigated by the traction motor 38.

The above-described embodiment of the invention is provided purely for purposes of example. For instance, the present invention can also be used on primarily rear wheel drive vehicles. Additionally, the present invention can be utilized in a vehicle where regenerative braking is applied on a secondary non-driven wheeled axle and a clutch can be actuated to torsionally connect the non-driven wheeled axle to the primary driven wheeled axle to relieve a slip condition. Many other variations, modifications, and applications of the invention may be made.

We claim:

1. A method of braking a vehicle, comprising:

electrically regeneratively braking a first wheeled axle;

sensing for a slip condition of a wheel of said first wheeled axle; and torsionally connecting said first wheeled axle with at least a second wheeled axle upon a slip condition of a wheel of said first wheeled axle.

2. A method of braking a vehicle as described in claim 1, wherein said regenerative braking first occurs on a driven axle.

3. A method of braking a vehicle as described in claim 1, further comprising reducing the regenerative braking of said first and second wheeled axles below a slip condition of said first wheeled axle.

4. A method of braking a vehicle as described in claim 1, further including shutting off said regenerative braking of said first wheeled axle and engaging said first wheeled axle with a second brake system having an antilock braking mode of operation.

5. A method of braking a vehicle having an electrically driven and an electrically regenerative braked first wheeled axle, said vehicle also having a second wheeled axle selectively torsionally connected with said first wheeled axle, said method comprising:

electrically regeneratively braking said first wheeled axle;

sensing to determine if said first wheeled axle wheels are slipping; and selectively torsionally connecting said second wheeled axle to said first wheeled axle to electrically regeneratively brake said first and second wheeled axles.

6. A method of braking a vehicle as described in claim 5, further including reducing the electric regenerative braking of said first and second axles to cause said wheels on said first wheeled axle to come out of a slip condition.

7. A method of braking a vehicle as described in claim 5, further including braking said first wheeled axle with a second brake system having an antilock mode of operation.

8. A method of braking a vehicle having an electrically driven and regeneratively braked first wheeled axle and a second wheeled axle, said vehicle also having a second brake system for said first axle having an antilock mode of operation, said method comprising the steps of:

sensing a slip condition on a wheel of said first axle;

determining if said first axle is currently being regeneratively braked;

braking said first wheeled axle with said second brake system in an antilock mode of operation when a slip condition is sensed on a wheel of said first wheeled axle and when said electric regenerative brake is not activated;

sensing if said second wheeled axle is torsionally connected with said first wheeled axle if said electric regenerative brake is activated;

engaging said second brake system on said first wheeled axle in an antilock mode of operation if said second wheeled axle is torsionally connected to said first wheel axle or reducing the electric regenerative braking of said first axle to a level below said wheel slip level; and torsionally connecting said second wheeled axle with said first wheeled axle if said first wheeled axle is being electrically regeneratively braked.

9. A method as described in claim 8, wherein said first wheeled axle is being electrically regeneratively braked to compression brake said vehicle.

10. A method of braking a vehicle as described in claim 8, wherein said vehicle is electrically regeneratively braked in response to an operator command signal.

11. A method of braking a vehicle as described in claim 9, wherein said first wheeled axle is driven by an electric motor or an internal combustion engine.

12. A method as described in claim 10, wherein there are two motor generators and all electric regenerative braking is performed by a second motor generator.

* * * * *